Dec. 2, 1930.  T. W. JOHNSON  1,783,430

METHOD OF AND APPARATUS FOR TREATING FRUIT TREES

Filed April 2, 1929  2 Sheets-Sheet 1

Inventor
Thomas W. Johnson
By Lyon & Lyon
Attorneys

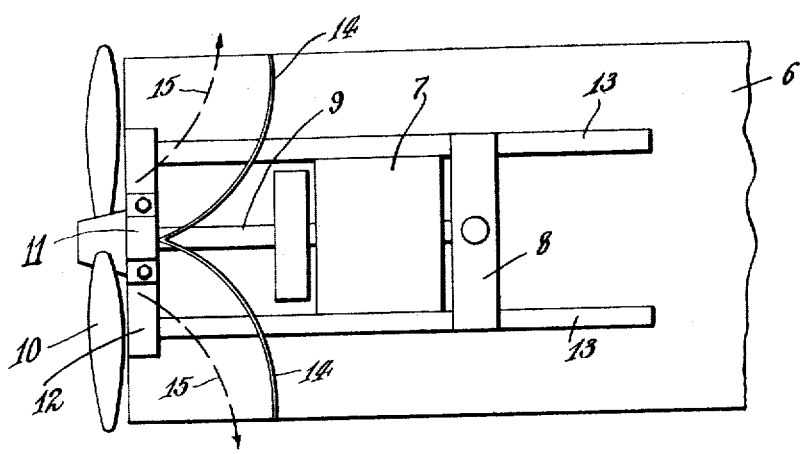
Fig. 2.
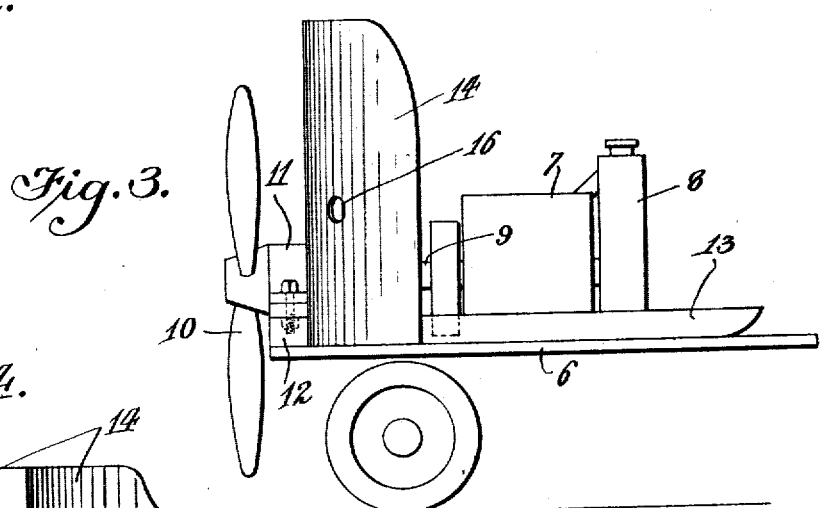
Fig. 3.
Fig. 4.
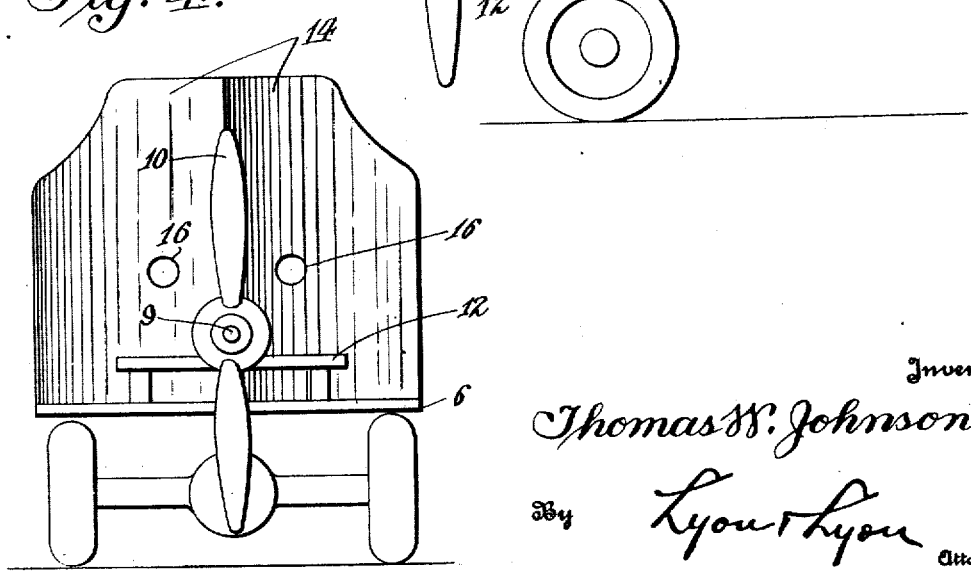
Inventor
Thomas W. Johnson
By Lyon & Lyon
Attorneys Patented Dec. 2, 1930

1,783,430

UNITED STATES PATENT OFFICE

THOMAS W. JOHNSON, OF MOUNTAIN VIEW, CALIFORNIA, ASSIGNOR TO VICTOR H. OWEN, OF OAKLAND, CALIFORNIA

METHOD OF AND APPARATUS FOR TREATING FRUIT TREES

Application filed April 2, 1929. Serial No. 351,894.

This invention relates to a method of treating fruit trees so as to increase the production of good fruit. The method also relates to a process of preventing the destruction of the fruit by mould or rot. The invention also relates to an apparatus by means of which the method may be put into operation.

Substantially all blossoms of fruit trees, such as the apricot, peach, apple, plum, almond, etc., include a calyx ring or outer circle of the floral envelopes. After the blossoms fall the calyx ring is retained and the fruit begins to form within the ring and the calyx is gradually displaced and eventually dislodged by the growing fruit.

It has been discovered that the fruit crops are heavily damaged and the productivity of orchards and fruit trees materially reduced unless the calyx ring (otherwise known as the jacket or shuck) is removed soon after the young fruit begins to form therein.

If the calyx or jacket is not removed and instead the fruit tree is subjected to a rain or a heavy precipitation of dew, the moisture retained beneath, in or on the jacket or calyx causes a mould and/or rot. If the jacket or calyx is allowed to remain on the young, growing fruit with the moisture therebeneath, thereon or therein, the mould prevents the fruit from growing and causes destruction thereof by rot or decay. These conditions are, of course, most pronounced in certain parts of the country where rains occur during or immediately after the trees are in bloom, or where the orchards are subjected to heavy fogs or dews, as along the coast of California. The damage caused by mould or rot of this sort, engendered beneath in, or on the calyx, has been known to reduce the crop by seventy-five per cent during certain years. It is to be understood that if the young fruit are not subjected to rain or moisture, then the jacket or calyx will become dry and fall off naturally.

Furthermore, fruit orchards, particularly apricot, almond, plum and peach, are subject to the ravages of the curculio, which apparently thrives during that period of time that the trees are in bloom and immediately thereafter. It has been found very difficult to free orchards from this insect, as the use of arsenical sprays and other insecticides capable of acting upon the curculio is not advisable, these sprays adversely affecting the foliage, buds and young fruit.

The method hereinafter described in detail is directed toward the removal of the calyx, shuck or jacket from the young fruit and the moisture therebeneath, therein or thereon, so as to prevent the development of mould and rot thereunder, and is also directed toward the removal of the curculio. In describing the invention, reference will be had to the appended drawings, in which:

Fig. 2 is a plan view of one form of apparatus adapted to be used in carrying out the method.

Fig. 3 is a side elevation of the apparatus shown in Fig. 2.

Fig. 4 is a front elevation of the apparatus shown in Figs. 2 and 3.

Figure 1:
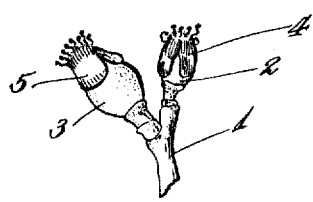
Fig. 1 illustrates young apricots with the calyx thereon.

Referring to the drawings, particularly to Fig. 1, there is illustrated a branch of an apricot tree 1, bearing a very young apricot fruit 2 and a slightly larger apricot 3. 4 and 5 represents the jackets, shucks or calyx rings, the calyx 4 being rather firmly in position upon the fruit 2, whereas the calyx 5 is in the process of being thrown off by the growth of the fruit.

Fruit in the stage shown in Fig. 1 are subject to the development of mould beneath the calyx rings 4 and 5, as has been stated hereinabove, and it is the object of this invention to remove the calyx rings or jackets from the fruit and the moisture therebeneath, therein or thereon, while they are substantially in the condition shown in Fig. 1.

Generally described, the invention comprises removing the calyx rings from young, undeveloped fruit, and the moisture retained beneath, on or in the calyx as aforesaid. The particular method embraced by this invention comprises subjecting the trees to a forcible, directed current of air, the air being preferably applied at a velocity sufficient to blow the calyx and the moisture carried thereby off the young fruit.

In carrying out the invention the apparatus shown in Figs. 2 to 4 inclusive may be employed. The apparatus is preferably mounted upon a suitable portable base, such as for example, a truck body 6 and preferably at the rear thereof. The apparatus may include a suitable power imparting means such as a motor 7 which, as is illustrated in the drawings, may be an internal combustion water cooled engine. Such power means 7 may be operably connected to a radiator 8 and also connected, as by means of a suitable shaft 9 with a propeller 10. The shaft 9 may be journaled in a block 11 attached to a cross member 12, which in turn may be attached to the truck body 6. The propeller, shaft, motor, etc., may all be mounted upon skids 13, so as to facilitate the removal of the apparatus from the truck.

It will be noticed that the apparatus shown in Figs. 2 to 4 includes a propeller mounted upon a shaft extending longitudinally of the truck or other portable means 6. In order to effectively utilize the apparatus a deflector 14 is preferably positioned on the truck body 6. and in operative relation with the apparatus thereon, so as to cause the air set in motion by the air screw or propeller 10 to be deflected as indicated by the arrows 15, to each side of the longitudinal axis of the truck or other portable support 6. This construction permits that the apparatus be moved between adjoining rows of fruit trees and simultaneously subject both rows of trees to a current of air of sufficient intensity to blow off and remove the calyx rings adhering to the young fruit.

If desired, apertures, as the apertures 16 may be provided in the wind deflector 14 so as to direct some air currents against or into contact with the motor 7, thereby assisting in the cooling of said motor.

Figure 5:
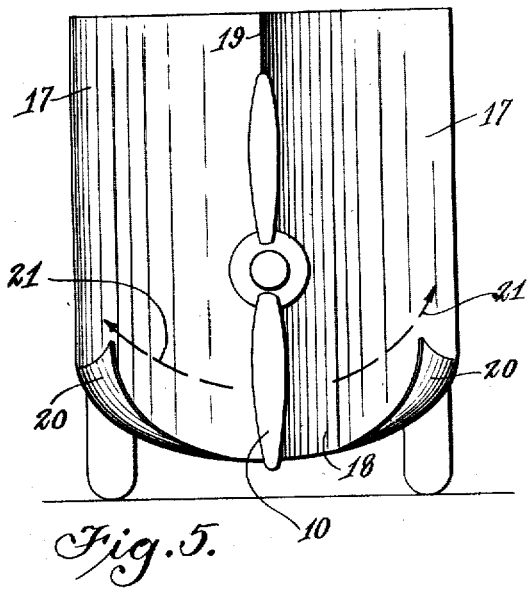
Fig. 5 is a front elevation of a modified form of apparatus.
Figure 6:
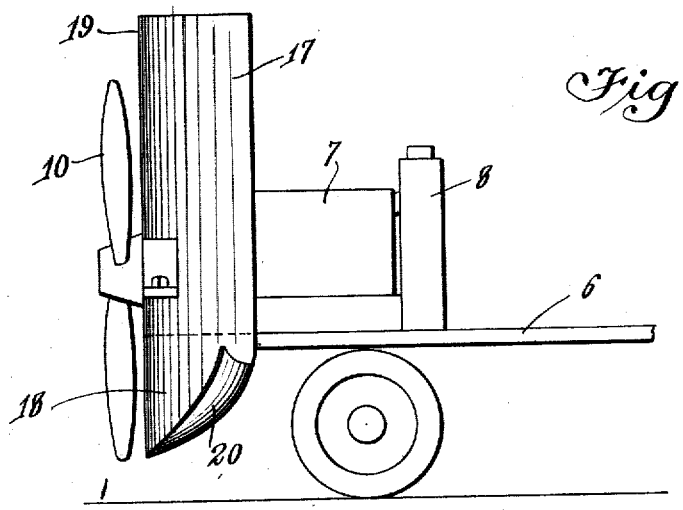
Fig. 6 is a side elevation of the modified form of apparatus shown in Fig. 5.

As shown in Figs. 5 and 6, a modified form of apparatus may include a motor 7 mounted upon the rear portion of a truck, trailer or other movable member 6, said motor 7 being operatively connected to an air screw or propeller 10 having a wind deflector 17 extending below the level of the truck or trailer body 6, as is indicated at 18.

The wind deflector 17 may be provided with an apex 19 substantially directly back of the axis of the air screw or propeller 10, the sides of the deflector 17 curving outwardly from the apex 19 in the manner of the deflector 14 illustrated in Fig. 2. The lower portion of the deflector 17 may be provided with outwardly and upwardly inclined portions 20, by means of which air displaced by the propeller 10 may be deflected both outwardly and upwardly, as indicated by the arrow 21.

The modified form of apparatus shown in Figs. 5 and 6, therefore, distributes and directs the air displaced by the propeller 10 with greater effectiveness than the wind deflector 14, shown in position on the apparatus illustrated in Figs. 2, 3 and 4, directing said air upwardly which more effectively causes the removal of the calyx rings from the fruit.

It is to be understood that it is not essential that the apparatus be mounted upon a truck or trailer in such manner as to have the longitudinal axis of the propeller shaft 9 lie in a plane substantially parallel to the longitudinal axis of the truck, trailer or other portable body 6. Instead the apparatus may be mounted upon a truck or trailer with the axis of the propeller shaft extending transversely to the longitudinal axis of the truck or trailer. Under these conditions, however, it is more difficult to subject adjoining rows of trees to a simultaneous current of air, whereas the apparatus illustrated in the drawings appended hereto permits two adjoining rows of trees to be simultaneously treated, thereby facilitating the entire operation.

The method and apparatus described herein need not be employed only for the removal of jackets, shucks or calyx rings from young fruit, but in addition may be employed to rid fruit orchards from the ravages of curculios. The curculio is dormant or indisposed to fly in the morning, and in carrying out the method of this invention for the removal of this insect from orchards, the trees are subjected to a positive, strong current of air during the morning hours. Preferably, canvas sheets or similar members are spread out beneath the trees, and the trees then subjected to a current of air, the insects being blown off the branches and falling onto the sheets or strips of canvas, from which they may be gathered for disposal.

By carrying out the method of this invention as applied to fruit trees immediately after the blossoms fall naturally, or within a relatively short period after the blossoms fall, the jackets or calyx rings and the water and moisture therein, may be removed effectively and the fruit permitted to develop without the possibility of destruction of a large portion of the crop by the development of mould and/or rot on the fruit.

It is to be understood that numerous changes and modifications can be made in the arrangement and combination of elements particularly described hereinabove, the method consisting essentially of removing calyx rings and/or calyx rings and moisture carried thereby from growing fruit by subjecting them to a strong directed current of air of sufficient intensity to blow said rings off the fruit.

I claim:

1. A method of treating fruit trees to increase the productivity thereof, including the step of removing the calyx rings from young fruit by subjecting the fruit to an artificial current of air.

2. In a method of treating fruit trees to increase the productivity thereof, the step of subjecting fruit trees, after blossoms have fallen off, to an artificial current of air of sufficient velocity to blow off calyx rings remaining on the trees.

3. In a method of treating fruit trees to increase the productivity thereof, the step of subjecting fruit trees, after blossoms have fallen off and young fruit has separated the calyx from the stem, to an artificial current of air of sufficient velocity to blow said calyx rings off the trees.

4. In a method of treating fruit trees to increase the production of sound fruit therefrom, the step of subjecting fruit trees after blossoms have fallen off but before calyx rings have fallen off, to a directed artificial current of air sufficient to remove moisture from contact with young fruit.

Signed at Mountain View, Calif., this 23rd day of March, 1929.

THOMAS W. JOHNSON.